United States Patent

[11] 3,603,480

| [72] | Inventors | Yoshihiko Irie<br>Kawasaki;<br>Mitsunori Nishizawa, Kawasaki; Shunro<br>Yamawaki, Tokyo, all of, Japan |
|---|---|---|
| [21] | Appl. No. | 837,028 |
| [22] | Filed | June 27, 1969 |
| [45] | Patented | Sept. 7, 1971 |
| [73] | Assignee | Tokico Ltd.<br>Kanagawa-ken, Japan |
| [32] | Priority | July 2, 1968 |
| [33] | | Japan |
| [31] | | 43/56,272 |

[54] FUEL SUPPLYING APPARATUS
7 Claims, 7 Drawing Figs.

[52] U.S. Cl. ............................................................. 222/20,
73/199, 137/355.23, 222/30, 222/35, 239/74,
239/198
[51] Int. Cl. ........................................................ B67d 5/30

[50] Field of Search............................................. 222/14, 20,
23, 30, 32, 35; 239/71, 74, 195, 197, 198; 73/198,
199; 137/355.2, 355.23, 355.26

[56] References Cited
UNITED STATES PATENTS

| 2,893,422 | 7/1959 | Schiltz............................. | 137/355.23 X |
| 2,936,096 | 5/1960 | Shawhan........................... | 222/14 |
| 3,346,142 | 10/1967 | Eklund............................. | 222/20 |

Primary Examiner—M. Henson Wood, Jr.
Assistant Examiner—Michael Y. Mar
Attorney—Holman & Stern ABSTRACT: A fuel-supplying apparatus having a flowmeter and an indicator at a preferred location in a fuel-supplying conduit pipe suspended from above a fuel-supplying service area where vehicles are supplied fuel. The flowmeter and the indicator are provided at a location adjacent a delivery nozzle in the fuel-supplying conduit and readily observable by the operator supplying fuel with said nozzle in hand.

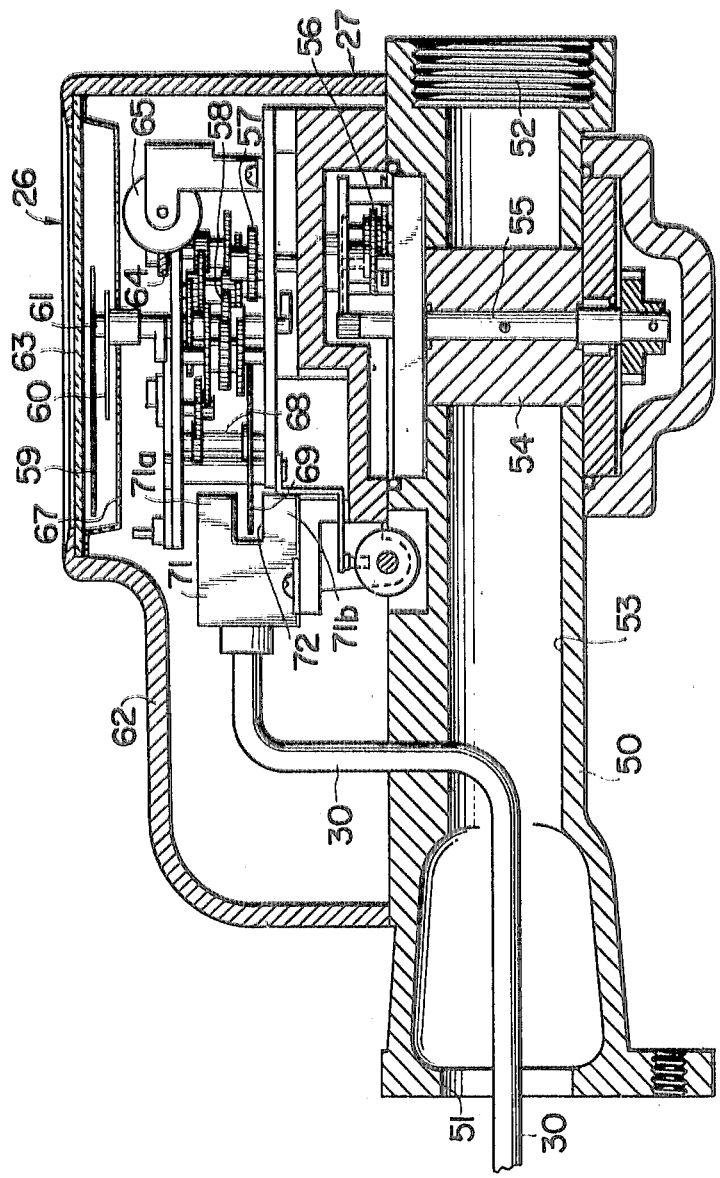

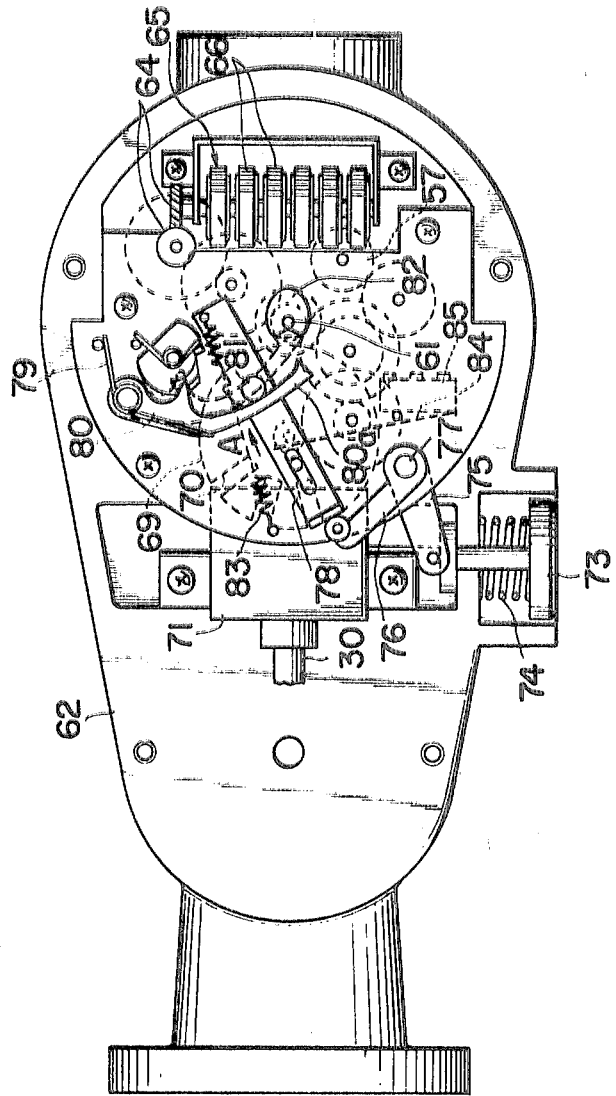

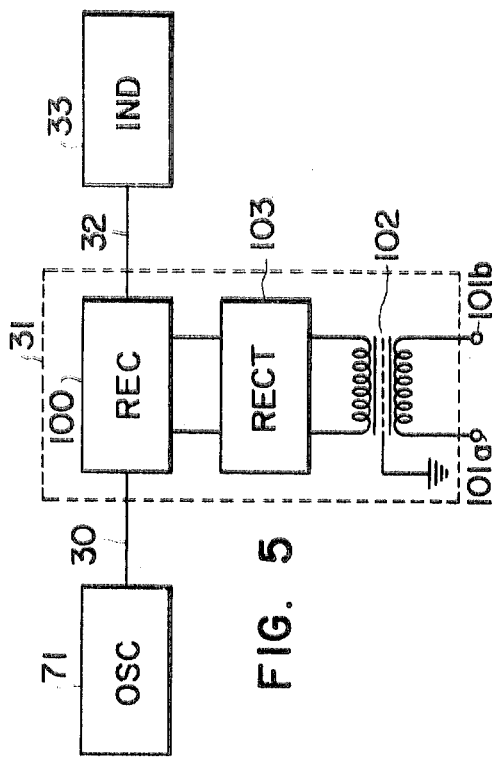
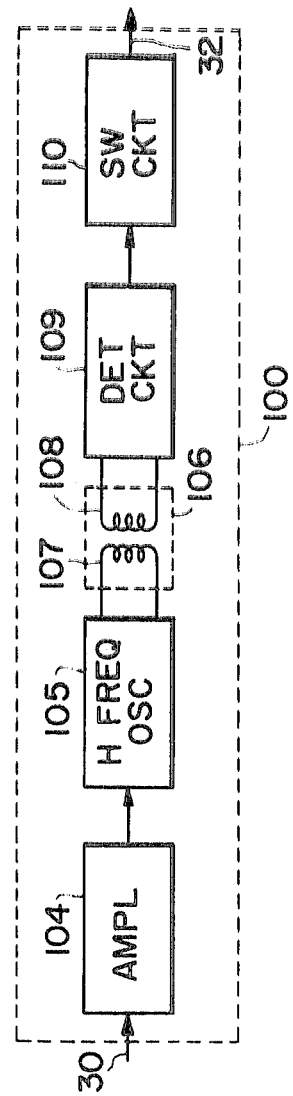
FIG. 5
FIG. 6

FUEL SUPPLYING APPARATUS

This invention relates to a fuel-supplying system and more particularly to a fuel-supplying apparatus for vehicles such as automobiles wherein a flowmeter and an indicator are provided at a location readily observable by a fuel-supplying operator, in a system such that the fuel is supplied after lowering a delivery unit with a fuel-supplying conduit and a nozzle from a structure over the passageway of the vehicles.

There has been known a fixed-stand-type fuel-supplying apparatus in which fuel-supplying stands or posts including respectively motors, suction pumps, flowmeters and indicators therein are provided in a desired number on an island on the ground surface in a service area of a gasoline filling station. In such conventional system it is common to notice that the whole service area is not effectively used for vehicles to be supplied with fuel and a vehicle entering the station site often collides with the stands or posts in the service area.

For overcoming the drawbacks as described there has been proposed a system in which a fuel-supplying conduit pipe means and a nozzle are suspended from a ceiling or overhead beam which is horizontally extended from walls or supports of a structure in the station and in which said fuel pipe means and nozzle can be raised or lowered and extended to a level sufficient to supply fuel to vehicles. Generally in the system as described there are provided a flow meter in a fixed conduit pipe inside the walls or supports leading to a fuel-supplying conduit from a fuel reservoir under the ground, and an electrical indicator board of a large size located on said ceiling or beam to be readable by the operator and a driver and designed so as to digitally show the number of measured amount of fuel in response to signals sent from said flowmeter. The operator is therefore required to look up at the indicator board frequently, which requires looking away from the nozzle while supplying fuel in a desired amount and especially depending on the situation of the vehicle as stationed he must turn backward and upward to look at the board while supplying fuel in an amount as required by the driver, so that the operator is much inconvenienced by observation of the amount of the fuel to be supplied according to the request of the driver. It was not convenient also for the driver to look up at the indicator board from his seat in the vehicle.

According to the present invention the above defects and disadvantages are eliminated by providing a flowmeter and an indicator at a location in the path of the fuel-supplying conduit in the overhead ceiling or beam and in the vicinity of said nozzle to be raised or lowered to serve for supplying fuel.

A primary object of the present invention is therefore to provide a fuel-supplying apparatus of a construction which is designed to supply fuel to vehicles by lowering a fuel-supplying conduit from a ceiling or overhead beam extended horizontally or transversely from a structure outside the service area, which has no projection nor stand erected from the ground surface and is therefore effective in permitting use of the whole area, and which includes a flowmeter and an indicator at an adequate place in the fuel-supplying conduit to indicate the amount of fuel to be supplied, thereby make it easy for the operator and if necessary for the driver to observe same.

Another object of the invention is to provide a fuel-supplying apparatus which can indicate simultaneously the amount of fuel to be supplied in association with an indicator provided at a location in the fuel-supplying conduit to be raised or lowered and an indicator provided on a structure having a ceiling or overhead beam.

A further object of the invention is to provide a fuel-supplying apparatus which has a mechanically operable indicator on the fuel-supplying conduit raised or lowered at a location easily observed by the operator in the vicinity of a delivery nozzle, and a flowmeter integrated with said fuel-supplying conduit and transmitting electrically measured values through said fuel-supplying conduit to the outside of the conduit.

Still a further object of the invention is to provide a fuel-supplying apparatus having an electrical circuit which has a construction such that the risk of explosion and other troubles due to short circuiting, if occurred, in wires transmitting the measured signals from the flowmeter on the fuel-supplying conduit may be avoided and if occurred may not incidentally affect other equipments.

Other objects and features of the present invention will be apparent from the following detailed description in conjunction with the accompanying drawings, in which:

FIG. 3 is an enlarged side view longitudinally sectioned along the line III—III of the indicator and the flowmeter part as shown in FIG. 2;

FIG. 4 is an enlarged plan view of the indicator and the flowmeter part as shown in FIG. 2, in which the upper cover is taken away;

FIGS. 5 and 6 are respectively block diagrams of an embodiment of a system for transmitting signals of the measured value.

Figure 1:
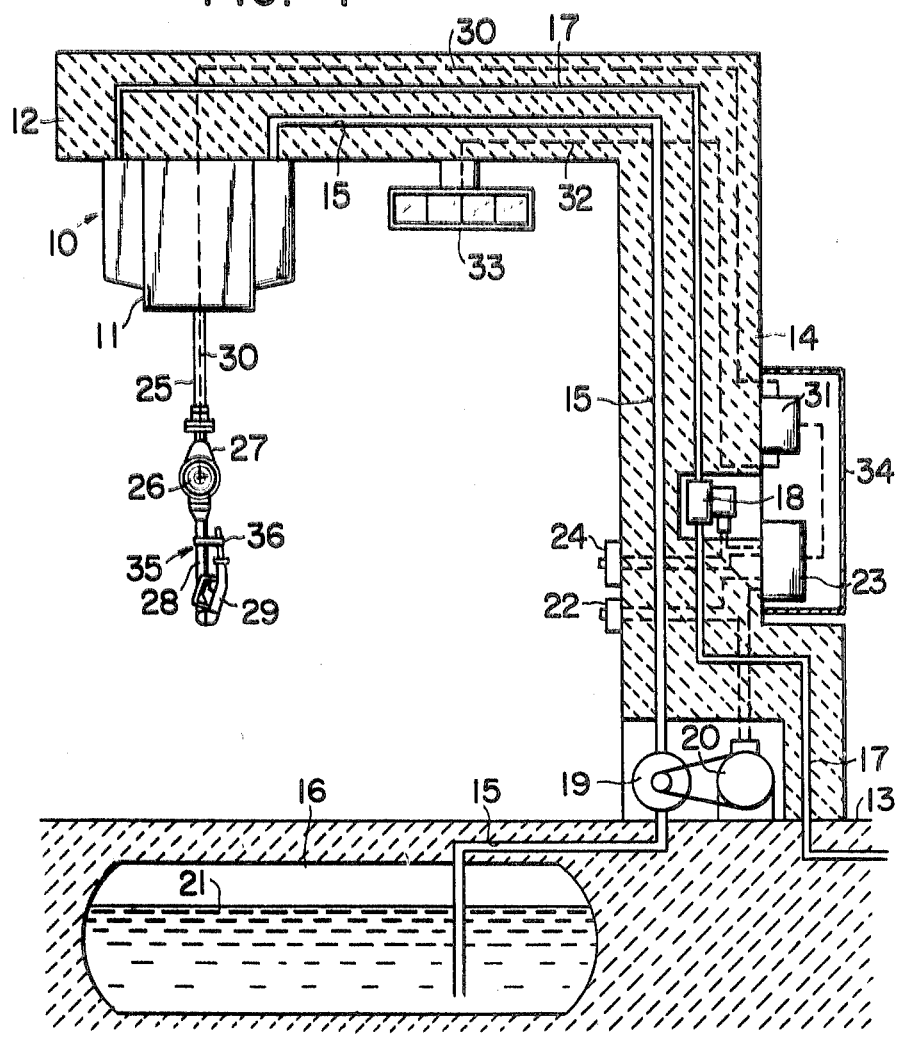
FIG. 1 is a longitudinal sectional view of an embodiment of a fuel-supplying apparatus according to the present invention.
Figure 7:
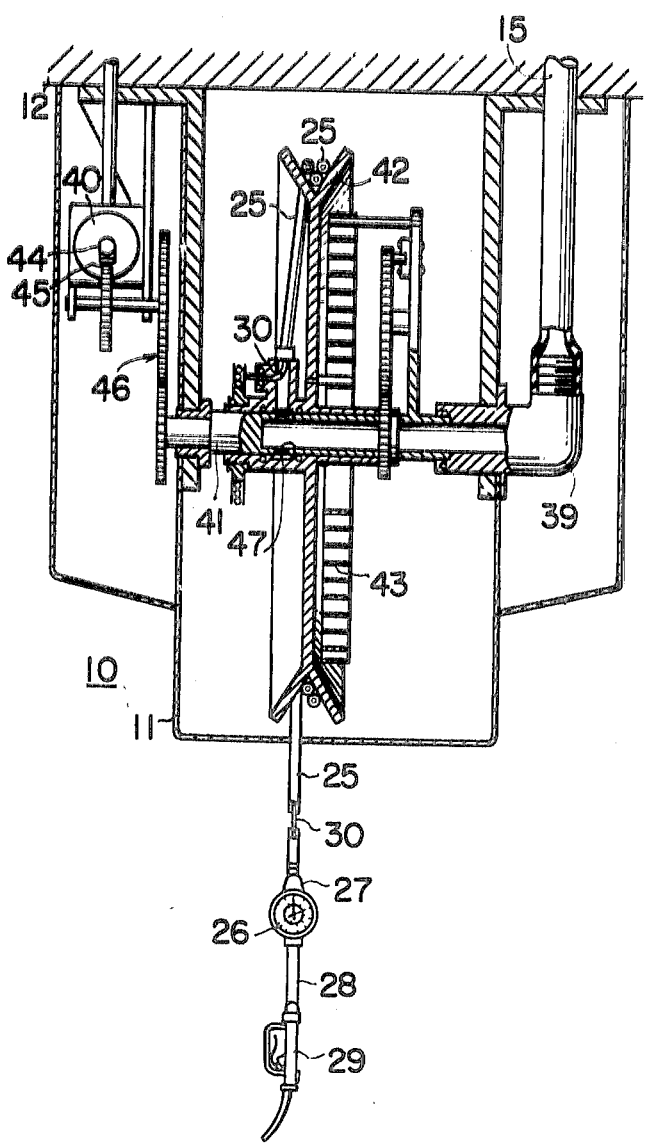
FIG. 7 is a longitudinal sectional view of a hose reel assembly shown in FIG. 1.

Now FIG. 1 shows a view of an embodiment of a fuel-supplying apparatus of the invention in which a sectional elevation is schematically illustrated. In the figure, casing 11 of a hose reel assembly 10 which is shown in detail in longitudinal section in FIG. 7, is secured to the lower surface of a ceiling or overhead beam 12. The ceiling 12 is extended horizontally or transversely from an upper portion of a wall or other generally vertical support 14 erected from the ground surface 13 and is further extended over the service area in which the fuel-supplying operation is performed for vehicles. The ceiling 12 is of such a height that any vehicle having a load thereon may not be obstructed of its free passage. A wall of the office house or similar structure may be used for said wall or support 14, or the latter may be constructed separately from said house. Hereinafter the structure including a ceiling or beam 12 and a wall or support 14 or equivalents thereof is denominated merely as a structure.

A fixed conduit pipe 15 passes through the wall 14 from inside a fuel reservoir 16 provided under the ground and through the ceiling 12 and reaches to a fixed bearing pipe 39 in a hose reel assembly 10 shown in FIG. 7. An air pipe 17 of which one end is connected to a source of pressurized air passes through the wall 14 and a three-way electromagnetic valve 18 and further through the interior of the ceiling 12 and is connected to a cylinder of an air motor 40 inside the hose reel assembly 10. There is provided a suction pump 19 in the way of the fixed conduit 15, which is operated by an electric motor 20 to suction gasoline 21 from the reservoir 16. The motor 20 is actuated when it is connected in circuit to a power source 23 by a switch 22. Electromagnetic valve 18 is actuated in response to opening and closing of the circuit to the power source 23 by a switch 24.

A hose pipe 25 is a flexible fuel-supplying conduit pipe wound on a hose reel 42 of a Y-shape in cross section rotatable about a shaft 41, and is suspended from the reel to be raised upwardly and lowered downwardly. The hose pipe 25 consists of an oil-resistant flexible material and has a volumetric flowmeter 27 which includes integrally therewith a small-sized indicator 26 later described at its forward end and a fuel delivery nozzle 29 on the forward end of said flowmeter through the hose pipe 28. The flowmeter 27 indicates the measured value on the indicator 26 mechanically and simultaneously generates signals electrically and sends out them to a wire 30 extending into or along the hose 25. The signals transmitted on the wire 30 in the hose 25 pass over the wire 30 in the ceiling 12 and the wall 14 and thereafter are supplied to a digital counter indicator board 33 after passing through a wire 32 through a special power source unit 31 later described. The indicator board 33 is a relatively large indication means provided at a location readily observable by the operator or the driver on the lower surface of the ceiling 12 or on the upper side surface of the wall 14 and makes digital indication by electric lights. Further, the power source 23 and the special power source unit 31 are provided in a power board 34.

Figure 2:
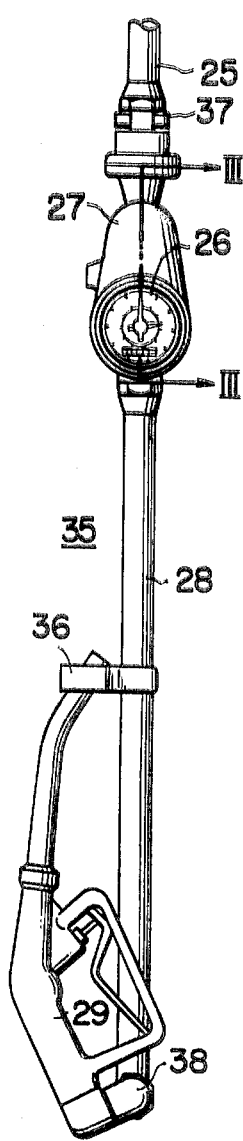
FIG. 2 is a plan view of an indicator and a fuel delivery nozzle provided on a fuel-supplying conduit pipe.

As seen in FIG. 2, said indicator 26 and the flowmeter 27 at the forward end of the hose 25, the hose pipe 28, and the nozzle 29 integrally form a delivery unit 35. When the fuel-supplying operation is not being carried out, the flexible hose pipe 25 is wound up around the reel 42 so that the delivery unit 35 is raised to a position near the casing 11 that will not obstruct the passage of vehicles. After a vehicle to be supplied with the fuel enters the service area and stops there, the switch 24 is pushed by an operator so that the pressurized air in the motor 40 is exhausted from the electromagnetic valve 18 through the pipe 17, and said delivery unit 35 moves downward to a waiting position approximately 1.8 m. high above the ground surface by the weight of said unit 35 and hose 25 and by force of a spring (not shown) in the cylinder of the air motor 40. Thereafter if the operator will grasp and pull the nozzle 29 downwardly the reel 42 is further rotated against and stores the force of a spring 43 whereupon the hose pipe 25 is extended further downward and the nozzle 29 is lowered from the waiting position to a supplying position suitable for supplying fuel to the vehicle.

As the switch 22 is pushed and closed, the pump 19 is operated causing it to apply a determined pressure on the gasoline which has been fed up to the nozzle 29 through the fixed pipe 15, a hollow portion 47 of the shaft 41 and the hose pipe 25. By disengaging the nozzle 29 from a stopper 36 and supplying fuel to the vehicle there is made an indication on the indicator 26 corresponding to the quantity of flow of gasoline passing through the flowmeter 27 and simultaneously the electrical indication is also made on the indicator board 33. In place of the switch 22 a switch cooperated with the hose reel 42 may be provided in the reel assembly 10 so as to actuate the pump 19 when said nozzle 29 is pulled downward from the waiting position.

Furthermore, the indicator 26 may be provided on the hose pipe 25 in a position readily observable by the operator who is supplying fuel with nozzle 29 in hand, that is, a position between adjacent the nozzle 29 and the level of the operator's head, for example, at a position of the shoulder of the operator. The nozzle 29 is swiveled rotatable by universal joints 37 and 38 respectively relative to the hose pipe 25 and nozzle 29.

When the nozzle 29 is released from the operator's hand on completion of fuel supplying, the delivery unit 35 is lifted up to the waiting position as described by the stored force of the spring 43 acting to partially wind the hose 30 upon the reel 42.

Further, when the switch 24 is closed again upon winding the hose pipe 25 upward, the electromagnet valve 18 is actuated so as to change its passage way. Thereupon pressurized air from its source passes through the electromagnetic valve 18 and the pipe 17 and is supplied to the air motor 40. As the air motor 40 is operated the sliding movement of its piston 44 is converted to a rotary action by a rack and pinion means 45, which rotary action is transmitted to the shaft 41 and reel 42 through a gear train 46 and thereby the hose pipe 25 is fully wound up by the reel 42 so that the delivery unit 35 is raised up near to the casing 11.

A longitudinal sectional view and a transverse plan view of the indicator 26 and the flowmeter 27 are respectively shown in FIGS. 3 and 4. A main body 50 of the flowmeter 27 has an inlet 51 adapted to be connected to the hose pipe 25 at its left end and an outlet 52 connected to the hose pipe 28 at its right end and also includes a flow passage 53 passing therethrough. In the flow passage 53 there are provided two cocoonlike rotors 54 forming a Roots-type flowmeter in which a rotary shaft 55 of one rotor 54 is rotated corresponding to the quantity of flow of gasoline passing through the flow passage 53. The rotation of the rotary shaft 55 is reduced in revolution through a first reduction gear train 56 and transmitted to a gear 57. The rotation of the gear 57 is further transmitted through a second reduction gear train 58 to a pointer shaft 61. The shaft 61 has a long pointer needle 59 and a short pointer needle 60 which in turn rotate so as to indicate the flow quantity on a dial 67. Herein the long needle 59 indicates 1 liter and the short needle 60 indicates 50 liters respectively per one rotation. Indication of the needles 59 and 60 is observed through a transparent portion or window 63 of a cover of casing 62. Simultaneously the rotation of the gear 57 is transmitted to a counter 65 through the second gear train 58 and a helical gear 64. Thus each wheel 66 of the counter 65 having numerical figures thereon rotates to show the integrated flow quantity.

Also the rotation of the gear 57 is transmitted to a shaft 68 through the gear train 58. The shaft 68 has a rotary disk 69 consisting of a conductive material having a plurality of slits 70 about its periphery. Said rotary disk 69 is rotated around the shaft 68 according to the flow quantity of gasoline. A Schmitt oscillator 71 has a recess 72 into which said rotary disk 69 is inserted and rotated. The oscillator 71 has coils respectively in the upper and lower projecting ends 71a and 71b which form therebetween said recess 72. Said oscillator 71 generates pulse signals corresponding in number to the number of revolution of the disk 69 with the slits 70. The generated pulse signals are transmitted as measured signals on the line of the wire 30 extending in the hose pipe 25. The present embodiment provides for transmitting 100 pulses per 1 liter. It should be noted that any type of flowmeter may well be used for the purpose other than the Roots-type flowmeter as described.

There is provided also a zero-resetting pushbutton 73 on a side of the casing 62, which button may be pushed so that the pointer needles 59 and 60 are set at zero positions before starting the fuel-supplying operation. By pushing of the button 73 against the force of a spring 74, levers 75 and 76 which are provided to rotate integrally turn clockwise about a shaft 77. One end of a sliding lever 78 is pushed by the free end of the lever 76 to slide in the direction of an arrow A opposite to the force of a spring 83. When the lever 78 once slides, a lever 80 energized to turn counterclockwise by a spring 79 is released from an engagement with a pin 81 on the lever 78 to thereby turn counterclockwise to a position as indicated by a broken line. With the turn of the lever 80 the forward end 80a thereof contacts and pushes the periphery of a heart-shaped cam 82 which turns about the shaft 61 to move to a position as indicated by a full line on the figure. At the same time, the needles 59 and 60 are turned to the position of zero to make resetting.

Following the sliding movement of the lever 78 in the direction of the arrow A, a leaf spring 84 is pushed to close a microswitch 85 whereupon a zero-resetting signal is sent from said switch 85 to the indicator board 33 passing through the wire 30. Consequently the indicator board 33 is electrically reset to zero as soon as the needles 59 and 60 of the indicator 26 which makes indications mechanically are reset at zero. Thus the pulse signals corresponding to the flow quantity sent from the oscillator 71 are transmitted in the wire 30 as shown in FIGS. 1 and 5, and then fed to a receiver 100 in the special power source unit 31. In FIG. 5, 100 v. AC of a suitable commercial power source from terminals 101a and 101b is applied on the primary side of an insulating transformer 102. The AC voltage which is dropped to 22 v. at the secondary side of the transformer 102 is converted to a DC voltage by a rectifier 103 and applied to the receiver 100.

A block diagram of the receiver 100 is now shown in FIG. 6. The signals from the wire 30 are amplified by an amplifier 104 and thereafter fed to a high frequency oscillator 105. The oscillation frequency of the oscillator 105 is then modulated as a carrier wave by said signals. The signals from the oscillator 105 are applied in a transmitter coil 107 of an insulating coil part 106 and oscillated as a high frequency magnetic field. A receiving coil 108 thus electrically insulated from said coil 107 is coupled with the coil 107 electromagnetically and receives the signals from the coil 107. The coils 107 and 108 are provided retaining a spatial distance sufficient to secure an electrical insulation. The signals received by the coil 108 are fed to a detecting circuit 109 in which the signal components are detected from the carrier waves of high frequencies, being waveformed in a subsequent switch circuit 110 and send out to the wire 32 as digital signals to be fed to the digital indicator board 33 for light indication.

There are provided a current-limiting resistance in the power source unit 31 whereby a slight current such as of a few milliamperes, 12 v. is flowed to the oscillator 71 side so that a short circuiting or a spark to occur in the wire 30 may not produce larger firing energy than the minimum firing energy in the vapor atmosphere of gasoline. Accordingly, even if an unexpected cutting or short circuiting due to twisting or other causes in the wire 30 extended in the hose 25 should happen, it should not induce the explosion of gasoline vapor or moisture. Moreover it is quite probable that the short circuiting of the wire 30 will not damage the indicator board 33 because the side of the oscillator 71 and the wire 30 are electrically insulated from the side of the indicator board 33 by the insulating coil 106.

While the invention has been described with respect to the specific and preferable embodiment, various modifications and variations thereof will be apparent to those skilled in the art without departing from the scope of which is set forth in the appended claims.

What is claimed is:

1. A fuel-supplying apparatus comprising a structure having a ceiling or beam transversely extending above a fuel-supplying service area, a fuel reservoir, a fixed conduit having one open end in the fuel reservoir and extending through the structure, a movable fuel-supplying conduit having one end connected to the other open end of the fixed conduit and a forward end provided with a delivery nozzle, said movable fuel-supplying conduit being suspended from the ceiling or beam and adapted to be raised upwardly or lowered downwardly, a flowmeter located in a passage way of the movable fuel-supplying conduit at a convenient location spaced from the delivery nozzle by a predetermined distance so as to measure the quantity of fuel discharged through said passage way from the nozzle, and an indicator integrally provided with the flowmeter on the movable fuel-supplying conduit and directly displaying the measured amount of the flowmeter, wherein said flowmeter and said indicator are conveniently located in the movable fuel-supplying conduit between said nozzle and the head level of an operator operating the apparatus so that the indicator can be readily observable by the operator who is supplying fuel with the nozzle in hand and the flowmeter and the indicator do not obstruct the raising of the movable fuel-supplying conduit, said movable fuel-supplying conduit consists of a flexible material.

2. The fuel-supplying apparatus of claim 1 which further comprises a wire leading from the flowmeter and extending along the movable fuel-supplying conduit, a second electric indicator fixed on a part of the structure for making indication by electric signals of the flow quantity of fuel delivered, and means for actuating the second indicator by signals transmitted through the wire, and wherein said flowmeter includes means for mechanically operating the first indicator integrally provided therewith responsive to the flow of fuel and means for generating the electric signals in accordance with flow quantity of the fuel and sending to the wire so as to operate the second indicator.

3. The fuel-supplying apparatus of claim 2 which further comprises a zero-resetting means consisting of a mechanism for mechanically returning pointer needles of the first indicator to a zero position and means for electrically generating zero-resetting signals simultaneously with an operation of the mechanism.

4. The fuel-supplying apparatus of claim 2 wherein electric currents of the electric signals flowing through the wire are small currents such that spark energy produced from the electric currents is smaller than the minimum firing energy of fuel atmosphere.

5. The fuel-supplying apparatus of claim 2, wherein said means for actuating the second electric indicator consists of means for electromagnetically sending and receiving only the electric signals being electrically insulated from the wire leading from the flowmeter, and a second wire sending signals received by the sending and receiving means to the electric indicator.

6. The fuel-suplying apparatus of claim 2, wherein said electric signals generated by the flowmeter and sent to the wires are electric pulse signals, and said means for operating the electric indicator consists of a high frequency oscillator means for oscillating carrier waves to be modulated by the electric pulse signals sent through the wires from the flowmeter, an insulating coil including a transmitting coil and a receiving coil electric-currently insulated from each other and electromagnetically coupled with each other, said insulating coil transmitting and receiving the signals from the oscillator means, and means for taking out pulse signals again from signals of the receiving coil of the insulating coil.

7. The fuel-supplying apparatus of claim 1, wherein said movable fuel-supplying conduit between said nozzle and said flowmeter and indicator absorbs shocks inflicted on said nozzle so as not to transmit the shocks to the flowmeter and indicator.